US010266432B2

(12) United States Patent
Lee et al.

(10) Patent No.: US 10,266,432 B2
(45) Date of Patent: Apr. 23, 2019

(54) APPARATUS AND METHOD FOR TREATING BALLAST WATER

(71) Applicant: University-Industry Foundation, Yonsei University, Seoul (KR)

(72) Inventors: Chang Ha Lee, Seoul (KR); Yongha Park, Gyeonggi-do (KR); Jae-Hoon Hong, Gyeonggi-do (KR); Tao Wei, Seoul (KR); Doo Wook Kim, Seoul (KR); Jae-Jeong Kim, Seoul (KR); Pil Rip Jeon, Seoul (KR)

(73) Assignee: University-Industry Foundation, Yonsei University, Seoul (KR)

( * ) Notice: Subject to any disclaimer, the term of this patent is extended or adjusted under 35 U.S.C. 154(b) by 692 days.

(21) Appl. No.: 14/821,821

(22) Filed: Aug. 10, 2015

(65) Prior Publication Data

US 2016/0039690 A1     Feb. 11, 2016

(30) Foreign Application Priority Data

Aug. 11, 2014    (KR) ........................ 10-2014-0103869

(51) Int. Cl.
| | | |
|---|---|---|
| *B63B 11/04* | (2006.01) | |
| *B63J 4/00* | (2006.01) | |
| *C02F 1/20* | (2006.01) | |
| *C02F 1/461* | (2006.01) | |
| *C02F 1/50* | (2006.01) | |
| *C02F 103/00* | (2006.01) | |

(52) U.S. Cl.
CPC ............... *C02F 1/50* (2013.01); *B63B 11/04* (2013.01); *B63J 4/002* (2013.01); *C02F 1/20* (2013.01); *C02F 1/46104* (2013.01); *C02F 2103/008* (2013.01)

(58) Field of Classification Search
CPC .. B63B 11/04; B63J 4/002; C02F 1/20; C02F 1/46104; C02F 1/50; C02F 2103/008
See application file for complete search history.

(56) References Cited

U.S. PATENT DOCUMENTS

| | | | |
|---|---|---|---|
| 2002/0174814 A1 | 11/2002 | Hunter | |
| 2003/0205135 A1 | 11/2003 | McNulty | |
| 2008/0277354 A1* | 11/2008 | Baerheim | ................ B63J 4/002 210/750 |

(Continued)

FOREIGN PATENT DOCUMENTS

| | | | |
|---|---|---|---|
| JP | 2009300228 A | * | 12/2009 |
| JP | 2012-050917 | | 3/2012 |

(Continued)

OTHER PUBLICATIONS

Machine translation of JP 2009-300228 A (2009) (obtained from JPO May 2018).*

(Continued)

*Primary Examiner* — Lucas A Stelling

(57) ABSTRACT

The present invention relates to an apparatus and a method for treating ballast water, and an exemplary embodiment of the present invention provides a ballast water treatment apparatus including: a tank; a spray nozzle which supplies ballast water in the form of droplets into the tank; and a gas circulation unit which supplies inert gas to the spray nozzle, and sucks inert gas that is not dissolved in the ballast water in the tank.

5 Claims, 9 Drawing Sheets

(56) References Cited

U.S. PATENT DOCUMENTS

| | | | | |
|---|---|---|---|---|
| 2010/0186784 A1* | 7/2010 | Ross | ............... | B05B 3/028 |
| | | | | 134/167 R |
| 2012/0091071 A1* | 4/2012 | Short | ............... | B63J 4/002 |
| | | | | 210/764 |
| 2014/0021143 A1* | 1/2014 | Hummer | ............ | B63J 4/002 |
| | | | | 210/758 |

FOREIGN PATENT DOCUMENTS

| | | |
|---|---|---|
| KR | 10-0542895 | 1/2006 |
| KR | 10-0840762 | 6/2008 |
| KR | 10-0883444 | 2/2009 |
| KR | 10-2014-0024302 | 2/2014 |
| KR | 10-2014-0065522 | 5/2014 |
| WO | WO 2012/116698 | 9/2012 |

OTHER PUBLICATIONS

Extended European Search Report dated Dec. 15, 2015 from the European Patent Office Re: Application No. 15180148.7.

\* cited by examiner

APPARATUS AND METHOD FOR TREATING BALLAST WATER

RELATED APPLICATION

This application claims the benefit of priority of Korean Patent Application No. 10-2014-0103869 filed Aug. 11, 2014, the contents of which are incorporated herein by reference in their entirety.

TECHNICAL FIELD

The present invention relates to an apparatus and a method for treating ballast water, and more particularly, to an apparatus and a method for treating ballast water which are capable of treating ballast water using inert gas.

BACKGROUND ART

In order to prevent marine pollution, the International Ballast Water Management Convention has been in force since 2004 by the International Maritime Organization (IMO). Accordingly, ballast water treatment equipment needs to be installed in all managed ships by 2020. Therefore, a number of researches are conducted on a method and an apparatus for treating ballast water in various countries such as Korea, U.S.A, Europe, Japan, and the like, and a lot of treatment methods such as filters, cavitation, ozone sterilization, chlorine sterilization, centrifugation, absence of oxygen, ultraviolet rays sterilization, and the like have been introduced.

In addition, in the shipbuilding industries in Korea, ballast water, which complies with the IMO convention, is produced by electrochemically sterilizing the ballast water, and Korean Patent Nos. 10-0542895 and 10-0840762 disclose a ballast water treatment apparatus using electrolysis.

However, the technology in the related art may cause an explosion due to hydrogen and oxygen produced when seawater is electrolyzed. In addition, HClO, which is included in the sterilized ballast water, is neutralized and then discharged to the outside, that is, the sea, and as a result, there is a problem in that the discharged HClO may disturb or destroy an ecosystem. Therefore, the ballast water treatment system in the related art is required to be investigated because of problems associated with the environment and safety.

Particularly, in a case in which an electrolysis device is sealed during an electrolysis process due to carelessness of an operator or a control error, oxygen gas and hydrogen gas, which are consistently produced, may cause an accident on a ship, and as a result, there is an urgent need for development of a process for solving the above problem.

SUMMARY OF THE INVENTION

The present invention has been made in an effort to provide an apparatus and a method for treating ballast water which are capable of sterilizing ballast water using inert gas such as carbon dioxide.

The present invention has also been made in an effort to provide an apparatus and a method for treating ballast water which are capable of reducing the usage amount of inert gas.

The present invention has also been made in an effort to provide an apparatus and a method for treating ballast water which are capable of increasing a contact specific surface area between inert gas and ballast water.

The present invention has also been made in an effort to provide an apparatus and a method for treating ballast water which are capable of reducing the amounts of generated hydrogen gas and oxygen gas that are additionally produced during electrolysis.

An exemplary embodiment of the present invention provides a ballast water treatment apparatus including: a tank; a spray nozzle which supplies ballast water in the form of droplets into the tank; and a gas circulation unit which supplies inert gas to the spray nozzle, and sucks inert gas in the tank.

Here, the gas circulation unit may be provided to supply the sucked inert gas back to the spray nozzle.

Another exemplary embodiment of the present invention provides a ballast water treatment apparatus including: a tank; a spray nozzle which supplies ballast water in the form of droplets into the tank; and a gas circulation unit which supplies inert gas in the form of bubbles into the tank, and sucks inert gas in the tank.

Here, the gas circulation unit may be provided to supply the sucked inert gas in the form of bubbles back into the tank.

Yet another exemplary embodiment of the present invention provides a ballast water treatment apparatus including: a tank; a spray nozzle which supplies ballast water in the form of droplets into the tank; and a gas circulation unit which includes a first gas supply line which supplies inert gas to the spray nozzle so that the inert gas, together with the ballast water, is supplied into the tank, a second gas supply line which supplies inert gas in the form of bubbles into the tank, and a gas discharge line which sucks inert gas in the tank.

Still another exemplary embodiment of the present invention provides a ballast water treatment apparatus including: a tank; a spray nozzle which supplies ballast water in the form of droplets into the tank, and is provided to spray the ballast water into an upper region in the tank; a gas circulation unit which includes one or more gas supply lines for supplying the inert gas into at least one region of the upper region and a lower region in the tank, and a gas discharge line for sucking the inert gas in the upper region in the tank; and an electrolysis unit which includes one or more electrode plates, and is provided in the tank.

As described above, the apparatus and the method for treating ballast water according to at least one exemplary embodiment of the present invention have the following effects.

It is possible to spray the ballast water flowing into a ship by using the spray nozzle, and then allow gaseous carbon dioxide to be dissolved in the ballast water.

In addition, it is possible to sterilize the ballast water by dissolving carbon dioxide, which is injected by a bubble generator, in the ballast water stored in the tank.

Therefore, it is possible to increase a contact specific surface area between the inert gas and the ballast water, thereby increasing solubility of carbon dioxide in the ballast water.

In addition, it is possible to reduce the usage amount of carbon dioxide by sucking and circulating carbon dioxide in the tank, and supplying the carbon dioxide back into the tank.

In addition, an effect of protecting a marine ecosystem is excellent compared to a ballast water treatment technology in the related art such as an electrolysis method, a method of using ozone, or a method of inputting chlorinated pesticides, and it is possible to improve safety because a large amount of hydrogen gas is not produced.

DETAILED DESCRIPTION

Figure 1:
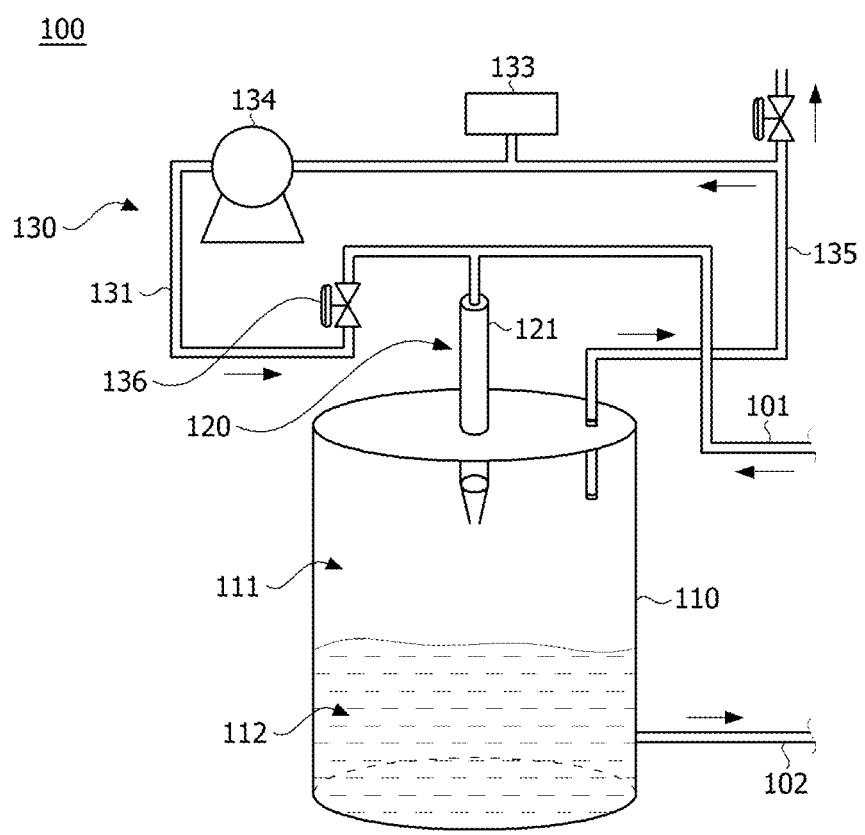
FIG. 1 is a conceptual view illustrating a ballast water treatment apparatus according to a first exemplary embodiment of the present invention.

Hereinafter, an apparatus and a method for treating ballast water according to exemplary embodiments of the present invention will be described in detail with reference to the accompanying drawings.

In addition, the same or corresponding constituent elements will be designated by the same or similar reference numerals regardless of reference numerals, and a duplicated description thereof will be omitted. For convenience of description, sizes and shapes of the illustrated constituent elements may be exaggerated or reduced.

FIG. 1 is a conceptual view illustrating a ballast water treatment apparatus 100 according to a first exemplary embodiment of the present invention.

Referring to FIG. 1, the ballast water treatment apparatus 100 according to the first exemplary embodiment of the present invention includes a tank 110, a spray nozzle 120 which supplies ballast water in the form of droplets into the tank, and a gas circulation unit 130 which supplies inert gas to the spray nozzle 120 and sucks inert gas in the tank 110.

In addition, the inert gas may include carbon dioxide.

The tank 110 may be a sealed tank. In addition, the tank 110 is configured to prevent inside substances from leaking at internal pressure of maximum 50 atm. In addition, ballast water may flow into the tank 110. In addition, a sterilization treatment process for ballast water may be carried out in the tank 110. In addition, the ballast water, which has undergone the sterilization treatment process in the tank 110, may be discharged to the outside.

The interior of the tank 110 may include an upper region 111 and a lower region 112. When the ballast water flows into the tank 110, a level of the ballast water in the tank 110 is increased from the lower region to the upper region.

In addition, the ballast water treatment apparatus 100 may include a ballast water supply line 101 for supplying the ballast water into the tank 110. In addition, the treatment apparatus 100 may include a ballast water discharge line 102 for discharging the ballast water in the tank 110 to the outside. Particularly, the ballast water discharge line 102 may be connected to the lower region 112 in the tank 110.

In addition, one or more valves, which open and close the respective lines and adjust a flow rate of the ballast water flowing through the respective lines, may be provided in the supply line 101 and the discharge line 102, respectively. The valve may include an electronic expansion valve or a solenoid valve.

In addition, the gas circulation unit 130 is provided to supply the sucked inert gas back to the spray nozzle 120. Therefore, it is possible to reduce the usage amount of inert gas by circulating and reusing the inert gas. Particularly, the gas circulation unit 130 is provided to suck inert gas that is not dissolved in the ballast water in the tank. In addition, the gas circulation unit 130 is provided to supply the sucked inert gas back to the spray nozzle.

Specifically, the gas circulation unit 130 may include a gas supply source 133 for supplying inert gas. The gas supply source 133 may include an inert gas storage tank. In addition, the gas supply source 133 may include an inert gas generator.

In addition, the gas circulation unit 130 may include a circulation pump 134 which circulates the inert gas, a gas supply line 131 (also called 'first gas supply line') which connects the circulation pump 134 and the spray nozzle 120, and a gas discharge line 135 which is connected with the circulation pump, and has at least a partial region positioned in the tank 110.

In addition, one or more valves may be provided in each of the lines 131 and 135. The valve may include an electronic expansion valve, a solenoid valve, or a check valve. Referring to FIG. 1, an electronic expansion valve 136 may be provided in the gas supply line 131.

Here, the gas discharge line 135 and the gas supply line 131 each are connected with the circulation pump 134. Therefore, the inert gas, which flows into the gas circulation unit 130 through the gas discharge line 135, may be transferred to the gas supply line 131. Also, the gas discharge line 135 may be provided to supply the sucked inert gas into the gas supply line 131 or to discharge the sucked inert gas to the outside.

In addition, the spray nozzle 120 may be connected with the ballast water supply line 101 into which the ballast water flows. In this case, the ballast water supply line 101 may be connected with the gas supply line 131. Here, a check valve, which allows gas to flow toward the spray nozzle 120, may be provided in the gas supply line 131.

Therefore, only the ballast water or only the inert gas may be supplied to the spray nozzle 120. In addition, the ballast water and the inert gas may be supplied together to the spray nozzle 120. In this case, the ballast water and the inert gas may be sprayed together through the spray nozzle 120.

Meanwhile, the spray nozzle 120 may be provided to spray the ballast water and/or the inert gas into the upper region 122 in the tank 110.

The spray nozzle 120 may include a nozzle body 121 into which the ballast water and the inert gas flow, and a nozzle head 122 which has one or more spray holes. Here, the nozzle head 122 may be provided to be positioned in the upper region 111 in the tank 110, and the gas discharge line 135 may be provided to suck the inert gas in the upper region 111 in the tank 110 in accordance with an operation of the circulation pump 134. Particularly, the inert gas in the upper region 111 in the tank 110 may be inert gas that is not dissolved in the ballast water.

The ballast water flows in through the ballast water supply line 101, and then the ballast water flows toward the spray nozzle 120. The ballast water is injected into the tank 110 through the spray nozzle 120, and the injected ballast water is accommodated in the lower region of the tank 110. Meanwhile, the ballast water, which is sprayed through the spray nozzle 120, is formed as droplets having predetermined sizes. In this case, a diameter of the droplet may be 2,000 μm or less.

In addition, the inert gas may be supplied to the spray nozzle 120 through the gas supply line 131. The inert gas is mixed with the ballast water, and the inert gas, together with the ballast water, may be sprayed into the tank 110 through the spray nozzle 120. As the ballast water and the inert gas are sprayed through the spray nozzle 120, the ballast water may be sterilized.

Meanwhile, the inert gas, which is not dissolved in the ballast water, moves to the upper region 111 in the tank 110 due to a difference in density, and the remaining inert gas flows into the gas circulation unit 130 through the gas discharge tube 135.

Specifically, when the internal pressure in the tank 110 reaches predetermined pressure, the inert gas in the tank 110 may be sucked through the gas discharge tube 135.

In addition, the ballast water in the tank 110, for which the sterilization treatment is completed, may be discharged to the outside through the ballast water discharge line 102.

In addition, the treatment apparatus 100 may further include an electrolysis unit 440 (see FIG. 4) that will be described below.

Figure 2:
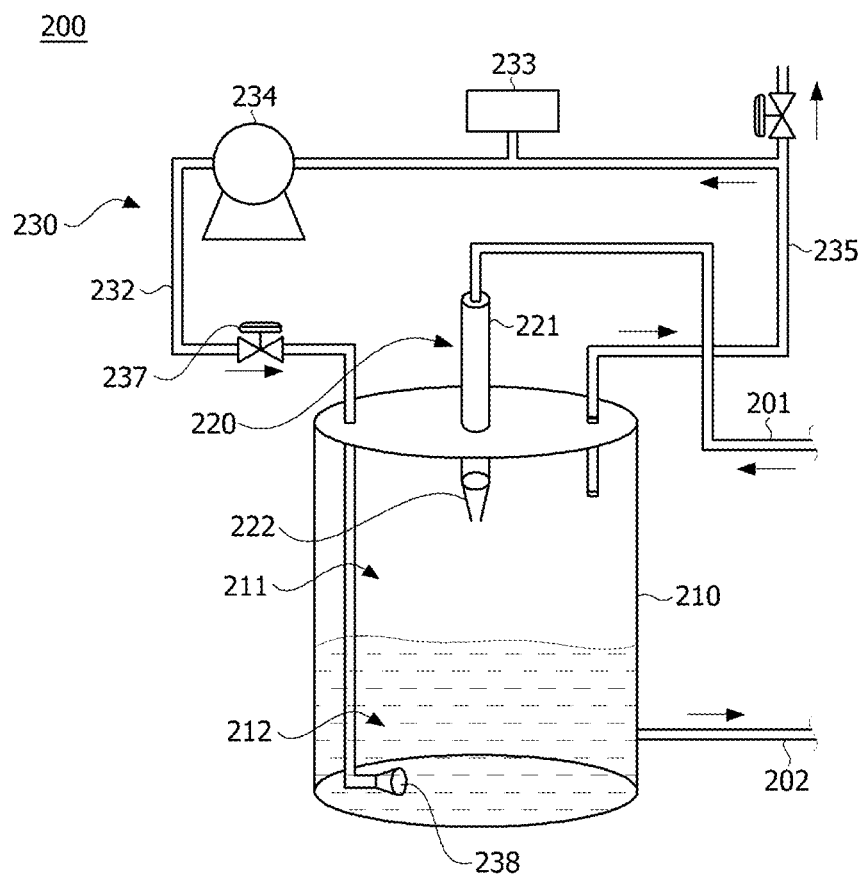
FIG. 2 is a conceptual view illustrating a ballast water treatment apparatus according to a second exemplary embodiment of the present invention.

FIG. 2 is a conceptual view illustrating a ballast water treatment apparatus 200 according to a second exemplary embodiment of the present invention.

Referring to FIG. 2, the ballast water treatment apparatus 200 according to the second exemplary embodiment of the present invention includes a tank 210, a spray nozzle 220 which supplies ballast water in the form of droplets into the tank 210, and a gas circulation unit 230 which supplies inert gas in the form of bubbles into the tank 210. In addition, the gas circulation unit 230 is provided to suck inert gas that is not dissolved in the ballast water in the tank 210.

Here, the gas circulation unit 230 is provided to supply the sucked inert gas in the form of bubbles back into the tank 210.

The tank 210 is the same as the tank 110 described in the first exemplary embodiment.

The interior of the tank 210 may include an upper region 211, and a lower region 212. When the ballast water flows into the tank 210, a level of the ballast water in the tank 110 is increased from the lower region to the upper region.

In addition, the ballast water treatment apparatus 200 may include a ballast water supply line 201 for supplying the ballast water into the tank 210. In addition, the treatment apparatus 200 may include a ballast water discharge line 202 for discharging the ballast water in the tank 210 to the outside. Particularly, the ballast water discharge line 202 may be connected to the lower region 212 in the tank 210.

In addition, one or more valves, which open and close the respective lines and adjust a flow rate of the ballast water flowing through the respective lines, may be provided in the supply line 201 and the discharge line 202, respectively. The valve may include an electronic expansion valve or a solenoid valve.

In addition, the gas circulation unit 230 may include a gas supply source 233 for supplying inert gas. The gas supply source 233 may include an inert gas storage tank. In addition, the gas supply source 233 may include an inert gas generator. In addition, the gas circulation unit 230 is provided to suck inert gas that is not dissolved in the ballast water in the tank. In addition, the gas circulation unit 230 is provided to supply the sucked inert gas in the form of bubbles back into the tank.

In addition, the gas circulation unit 230 may include a circulation pump 234 which circulates inert gas, a gas supply line 232 (also called 'second gas supply line') which connects the circulation pump 234 and an internal space of the tank 210, and a gas discharge line 235 which is connected with a bubble generator 238, which is provided in the gas supply line 232, and the circulation pump 234, and has at least a partial region positioned in the tank.

As described above, the spray nozzle 220 may include a nozzle body 221 and a nozzle head 222. In addition, the spray nozzle 220 may be provided to spray the ballast water and/or the inert gas into the upper region 222 in the tank 210.

Here, the nozzle head 222 may be provided to be positioned in the upper region 211 in the tank 210, and the gas discharge line 235 may be provided to suck the inert gas in the upper region 211 in the tank 210 in accordance with an operation of the circulation pump 234. Also, the gas discharge line 235 may be provided to supply the sucked inert gas into the gas supply line 232 or to discharge the sucked inert gas to the outside.

The ballast water flows in through the ballast water supply line 201, and then the ballast water flows toward the spray nozzle 220. The ballast water is injected into the tank 210 through the spray nozzle 220, and the injected ballast water is accommodated in the lower region of the tank 210. Meanwhile, the ballast water, which is sprayed through the spray nozzle 220, is formed as droplets having predetermined sizes. In this case, a diameter of the droplet may be 2,000 μm or less.

In addition, the bubble generator 238 may be provided to be positioned in the lower region 212 in the tank 210. In addition, the bubble generator 238 may be provided to be operated based on at least one of a level of the ballast water in the tank 210 and internal pressure of the tank 210.

In addition, the bubble generator 238 may be provided to be operated when a level of the ballast water in the tank 210 is a predetermined level or higher.

In addition, the bubble generator 238 may be provided to be operated based on internal pressure of the tank 210, or the bubble generator 238 may be provided to be operated based on a predetermined time.

In addition, one or more valves may be provided in each of the lines 232 and 235. The valve may include an electronic expansion valve, a solenoid valve, or a check valve. Referring to FIG. 2, an electronic expansion valve 237 may be provided in the gas supply line 232.

The inert gas (e.g., carbon dioxide) is supplied into the tank 210 through the gas supply line 237, and the inert gas, which is supplied into the tank 210, is injected into the lower region 212 in the tank 210 through the bubble generator 238.

In this case, the ballast water accommodated in the lower region 212 in the tank 210 comes into contact with inert gas bubbles. In addition, the bubble generator 238 may be provided to generate inert gas bubbles of 50 µm or less.

Meanwhile, the remaining inert gas bubbles, which are not dissolved, move to the upper region 211 in the tank 210 due to a difference in density, and then are dissolved in the ballast water while coming into contact with the ballast water sprayed through the spray nozzle 220 or flow into the gas discharge line 235.

In addition, the inert gas flowing into the gas discharge line 235 may be transferred back to the bubble generator 238 through the gas supply line 232 by the operation of the circulation pump 234.

Specifically, when the internal pressure in the tank 210 reaches predetermined pressure, the inert gas in the tank 210 may be sucked through the gas discharge tube 235.

In addition, the ballast water in the tank 210, for which the sterilization treatment is completed, may be discharged to the outside through the ballast water discharge line 202.

In addition, the treatment apparatus 200 may further include an electrolysis unit 440 (see FIG. 4) that will be described below.

Figure 3:
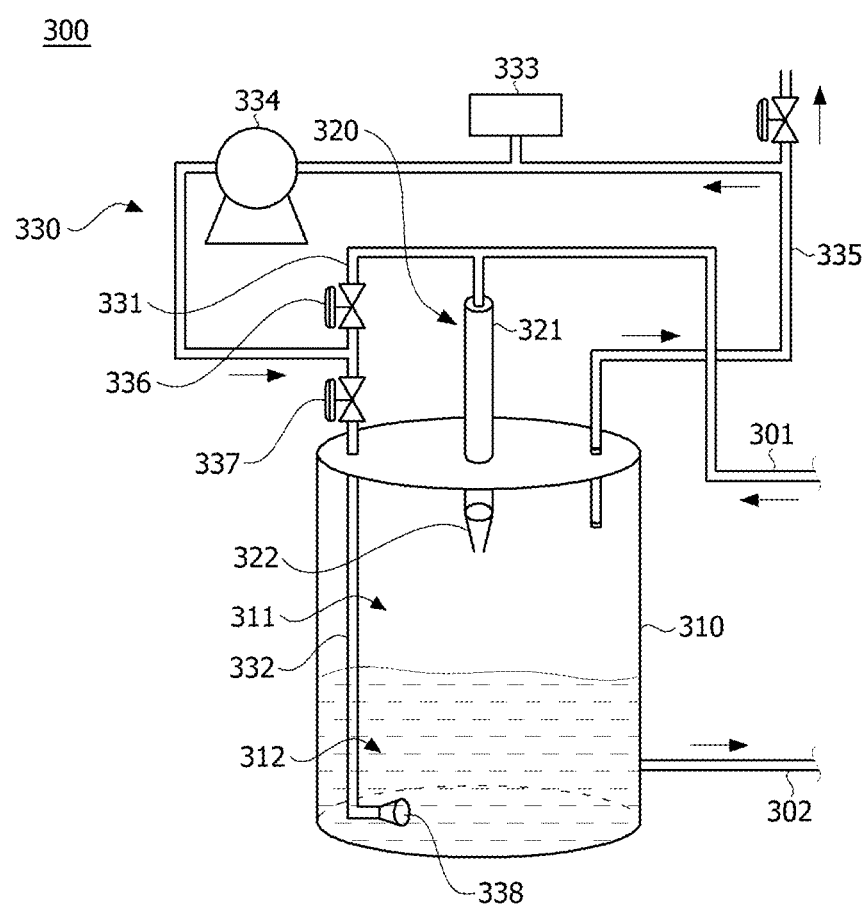
FIG. 3 is a conceptual view illustrating a ballast water treatment apparatus according to a third exemplary embodiment of the present invention.

FIG. 3 is a conceptual view illustrating a ballast water treatment apparatus 300 according to a third exemplary embodiment of the present invention.

Referring to FIG. 3, the ballast water treatment apparatus 300 according to the third exemplary embodiment of the present invention includes a tank 310, a spray nozzle 320 which supplies ballast water in the form of droplets into the tank 310, and a gas circulation unit 330.

The gas circulation unit 330 includes a first gas supply line 331 which supplies inert gas to the spray nozzle 320 so that the inert gas is supplied into the tank 310 together with the ballast water, a second gas supply line 332 which supplies inert gas in the form of bubbles into the tank 310, and a gas discharge line 335 which sucks inert gas in the tank 310. Also, the gas discharge line 335 may be provided to supply the sucked inert gas into the first gas supply line 331 or to supply the sucked inert gas into the second gas supply line 332 or to discharge the sucked inert gas to the outside.

In addition, the gas circulation unit 330 may include a gas supply source 333 which supplies inert gas, a circulation pump 334 which circulates inert gas, and a bubble generator 338 which is provided in the second gas supply line 332.

The inert gas, which is sucked through the gas discharge line 335, may be supplied back to at least one line 331 or 332 of the first gas supply line 331 and the second gas supply line 332 by an operation of the circulation pump 334.

In addition, the first gas supply line 331 and the second gas supply line 332 may branch off between the circulation pump 334 and the spray nozzle 320.

The interior of the tank 310 may include an upper region 311, and a lower region 312. When the ballast water flows into the tank 310, a level of the ballast water in the tank 310 is increased from the lower region to the upper region.

In addition, the ballast water treatment apparatus 300 may include a ballast water supply line 301 for supplying the ballast water into the tank 310. In addition, the treatment apparatus 300 may include a ballast water discharge line 302 for discharging the ballast water in the tank 310 to the outside. Particularly, the ballast water discharge line 302 may be connected to the lower region 212 in the tank 310.

In addition, one or more valves, which open and close the respective lines and adjust a flow rate of the ballast water flowing through the respective lines, may be provided in the supply line 301 and the discharge line 302, respectively. The valve may include an electronic expansion valve or a solenoid valve.

In addition, the spray nozzle 320 may be connected with the ballast water supply line 301 into which the ballast water flows. In this case, the ballast water supply line 301 may be connected with the first gas supply line 331. Here, a check valve, which allows gas to flow toward the spray nozzle 320, may be provided in the first gas supply line 331.

Therefore, only the ballast water or only the inert gas may be supplied to the spray nozzle 320. In addition, the ballast water and the inert gas may be supplied together to the spray nozzle 320. In this case, the ballast water and the inert gas may be sprayed together through the spray nozzle 320.

Meanwhile, the spray nozzle 320 may be provided to spray the ballast water and/or the inert gas into the upper region 311 in the tank 310.

The spray nozzle 320 may include a nozzle body 321 into which the ballast water and the inert gas flow, and a nozzle head 322 which has one or more spray holes. Here, the nozzle head 322 may be provided to be positioned in the upper region 311 in the tank 310, and the gas discharge line 335 may be provided to suck the inert gas in the upper region 311 in the tank 310 in accordance with an operation of the circulation pump 334.

The ballast water flows in through the ballast water supply line 301, and then the ballast water flows toward the spray nozzle 320. The ballast water is injected into the tank 310 through the spray nozzle 320, and the injected ballast water is accommodated in the lower region of the tank 310. Meanwhile, the ballast water, which is sprayed through the spray nozzle 320, is formed as droplets having predetermined sizes. In this case, a diameter of the droplet may be 2,000 µm or less.

In addition, the inert gas may be supplied to the spray nozzle 120 through the first gas supply line 331. The inert gas is mixed with the ballast water, and the inert gas, together with the ballast water, may be sprayed into the tank 310 through the spray nozzle 320. As the ballast water and the inert gas are sprayed through the spray nozzle 320, the ballast water may be sterilized (primary sterilization).

In addition, the bubble generator 338 may be provided to be positioned in the lower region 312 in the tank 310. In addition, the bubble generator 338 may be provided to be operated when a level of the ballast water in the tank 310 is a predetermined level or higher.

In addition, the bubble generator 338 may be provided to be operated based on internal pressure of the tank 310, or the bubble generator 338 may be provided to be operated based on a predetermined time. In this case, the bubble generator 338 may be provided to be operated for a predetermined time.

Meanwhile, one or more valves may be provided in each of the lines 331, 332, and 335. The valve may include an electronic expansion valve, a solenoid valve, or a check valve. Referring to FIG. 3, electronic expansion valves 336 and 337 may be provided in the first and second gas supply lines 331 and 332, respectively.

The inert gas (e.g., carbon dioxide) is supplied into the tank 310 through the second gas supply line 337, and the inert gas, which is supplied into the tank 310, is injected into the lower region 312 in the tank 310 through the bubble generator 338. In this case, the ballast water accommodated in the lower region 212 in the tank 310 comes into contact with inert gas bubbles. With the aforementioned contact, the ballast water may be sterilized (secondary sterilization).

In addition, the bubble generator 338 may be provided to generate inert gas bubbles of 50 µm or less. Meanwhile, the remaining inert gas bubbles, which are not dissolved, move to the upper region 311 in the tank 310 due to a difference in density, and then are dissolved in the ballast water while coming into contact with the ballast water sprayed through the spray nozzle 320 or flow into the gas discharge line 335.

In addition, by the operation of the circulation pump 334, the inert gas flowing into the gas discharge line 335 may be supplied back to the spray nozzle 320 through the first gas supply line 331, and may be supplied back to the bubble generator 338 through the second gas supply line 332.

Specifically, when the internal pressure in the tank 310 reaches predetermined pressure, the inert gas in the tank 110 may be sucked through the gas discharge tube 135. Here, the inert gas (e.g., carbon dioxide) may be supplied to the first and/or second gas supply lines 331 and 332 through the circulation pump 334.

In addition, the ballast water in the tank 310, for which the sterilization treatment is completed, may be discharged to the outside through the ballast water discharge line 302.

Figure 4:
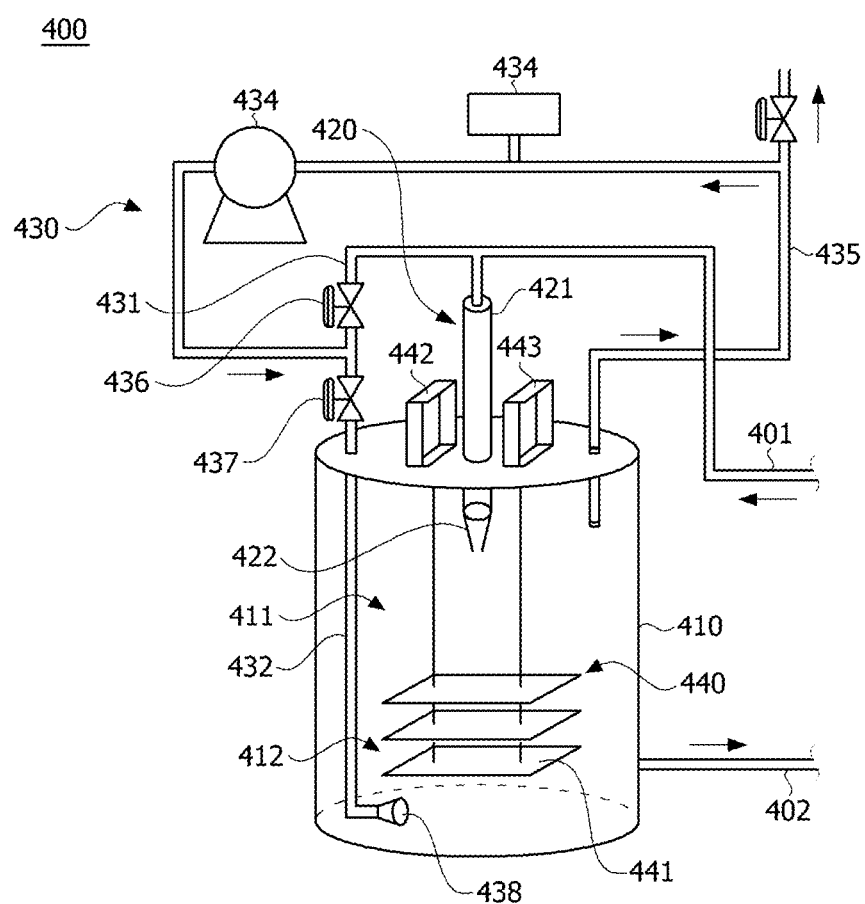
FIG. 4 is a conceptual view illustrating a ballast water treatment apparatus according to a fourth exemplary embodiment of the present invention.

FIG. 4 is a conceptual view illustrating a ballast water treatment apparatus according to a fourth exemplary embodiment of the present invention.

Referring to FIG. 4, the ballast water treatment apparatus 400 according to the fourth exemplary embodiment includes a tank 410, and a spray nozzle 420 which is provided to supply the ballast water in the form of droplets into the tank 410 and spray the ballast water into the upper region in the tank 410.

In addition, the treatment apparatus 400 includes a gas circulation unit 430. The gas circulation unit 420 includes one or more gas supply lines 441 and 442 which supply inert gas into at least one region of an upper region 411 and a lower region 412 in the tank 410, and a gas discharge line 435 which sucks inert gas in the upper region 411 in the tank 410.

In addition, the treatment apparatus 400 includes an electrolysis unit 440 provided in the tank 410. Particularly, the electrolysis unit 440 may be provided to be positioned in the lower region 411 in the tank 410. The electrolysis unit 440 includes one or more electrode plates 441. In addition, the electrolysis unit 440 may include a plurality of electrodes 442 and 443.

Specifically, the gas circulation unit 430 includes a first gas supply line 431 which supplies inert gas to the spray nozzle 420 so that the inert gas is supplied into the tank 410 together with the ballast water, a second gas supply line 432 which supplies inert gas in the form of bubbles into the tank 410, and a gas discharge line 435 which sucks inert gas in the tank 410.

In addition, the gas circulation unit 430 may include a gas supply source 433 which supplies inert gas, a circulation pump 434 which circulates inert gas, and a bubble generator 438 which is provided in the second gas supply line 432.

The inert gas, which is sucked through the gas discharge line 435, may be supplied back to at least one line 431 or 432 of the first gas supply line 431 and the second gas supply line 432 by an operation of the circulation pump 434.

In addition, the first gas supply line 431 and the second gas supply line 432 may branch off between the circulation pump 434 and the spray nozzle 420.

The interior of the tank 410 may include the upper region 411, and the lower region 412. When the ballast water flows into the tank 410, a level of the ballast water in the tank 410 is increased from the lower region to the upper region.

In addition, the ballast water treatment apparatus 400 may include a ballast water supply line 401 for supplying the ballast water into the tank 410. In addition, the treatment apparatus 400 may include a ballast water discharge line 402 for discharging the ballast water in the tank 410 to the outside. Particularly, the ballast water discharge line 402 may be connected to the lower region 412 in the tank 410.

In addition, one or more valves, which open and close the respective lines and adjust a flow rate of the ballast water flowing through the respective lines, may be provided in the supply line 401 and the discharge line 402, respectively. The valve may include an electronic expansion valve or a solenoid valve.

In addition, the spray nozzle 420 may be connected with the ballast water supply line 401 into which the ballast water flows. In this case, the ballast water supply line 401 may be connected with the first gas supply line 431. Here, a check valve, which allows gas to flow toward the spray nozzle 420, may be provided in the first gas supply line 431.

Therefore, only the ballast water or only the inert gas may be supplied to the spray nozzle 420. In addition, the ballast water and the inert gas may be supplied together to the spray nozzle 420. In this case, the ballast water and the inert gas may be sprayed together through the spray nozzle 420.

Meanwhile, the spray nozzle 420 may be provided to spray the ballast water and/or the inert gas into the upper region 411 in the tank 410.

The spray nozzle 420 may include a nozzle body 421 into which the ballast water and the inert gas flow, and a nozzle head 422 which has one or more spray holes. Here, the nozzle head 422 may be provided to be positioned in the upper region 411 in the tank 410, and the gas discharge line 435 may be provided to suck the inert gas in the upper region 411 in the tank 410 in accordance with an operation of the circulation pump 434.

The ballast water flows in through the ballast water supply line 401, and then the ballast water flows toward the spray nozzle 420. The ballast water is injected into the tank 410 through the spray nozzle 420, and the injected ballast water is accommodated in the lower region of the tank 410.

Meanwhile, the ballast water, which is sprayed through the spray nozzle 420, is formed as droplets having predetermined sizes. In this case, a diameter of the droplet may be 2,000 µm or less. In addition, the inert gas may be supplied to the spray nozzle 420 through the first gas supply line 431. The inert gas is mixed with the ballast water, and the inert gas, together with the ballast water, may be sprayed into the tank 410 through the spray nozzle 420. As the ballast water and the inert gas are sprayed through the spray nozzle 420, the ballast water may be sterilized (primary sterilization).

In addition, the bubble generator 438 may be provided to be positioned in the lower region 412 in the tank 410. In addition, the bubble generator 438 may be provided to be operated when a level of the ballast water in the tank 410 is a predetermined level or higher.

Meanwhile, one or more valves may be provided in each of the lines 431, 432, and 435. The valve may include an electronic expansion valve, a solenoid valve, or a check valve. Referring to FIG. 4, electronic expansion valves 436 and 437 may be provided in the first and second gas supply lines 431 and 432, respectively.

The inert gas (e.g. carbon dioxide) is supplied into the tank 410 through the second gas supply line 437, and the inert gas, which is supplied into the tank 410, is injected into the lower region 412 in the tank 410 through the bubble generator 438. In this case, the ballast water accommodated in the lower region 412 in the tank 410 comes into contact with inert gas bubbles. With the aforementioned contact, the ballast water may be sterilized (secondary sterilization).

In addition, the bubble generator 438 may be provided to generate inert gas bubbles of 50 µm or less. Meanwhile, the remaining inert gas bubbles, which are not dissolved, move to the upper region 411 in the tank 410 due to a difference in density, and then are dissolved in the ballast water while coming into contact with the ballast water sprayed through the spray nozzle 420 or flow into the gas discharge line 435.

In addition, by the operation of the circulation pump 434, the inert gas flowing into the gas discharge line 435 may be supplied back to the spray nozzle 420 through the first gas supply line 431, and may be supplied back to the bubble generator 438 through the second gas supply line 432.

In a case in which both the gas circulation unit 430 and the electrolysis unit 440 are provided, it is possible to reduce the usage amount of carbon dioxide, and the amounts of generated hydrogen gas and oxygen gas.

As the carbon dioxide bubbles are injected into the tank 410 by the bubble generator 438, internal pressure of the tank 410 is increased, and as the pressure is increased, the injected carbon dioxide bubbles allow carbon dioxide to be dissolved in the ballast water accommodated in the tank.

Meanwhile, in the case of the ballast water in which carbon dioxide is dissolved, concentration of oxygen in the ballast water is decreased, ion concentration is increased due to the dissolved carbon dioxide, and the pH (hydrogen ion concentration exponent) is decreased. In addition, concentration of carbon dioxide in the tank 410 is increased, such that the ballast water injected into the tank 410 is sterilized.

Meanwhile, the sterilization treatment for the ballast water may be carried out not only by the contact between the ballast water accommodated in the lower region 412 in the tank 410 and carbon dioxide sprayed by the bubble generator 438, but also by the electrolysis unit 440 at the electrode plate 441 to which a predetermined electric current (for example, 3 A) is supplied. During this process, carbon dioxide, hydrogen, oxygen, and chlorine gas are present in the tank 410.

When internal pressure of the tank 410 reaches predetermined pressure or higher, carbon dioxide, hydrogen, oxygen, or chlorine may flow into the gas circulation unit 430 through the gas discharge line 435. In this case, the carbon dioxide discharged to the gas circulation unit 430 moves to the first gas supply line 431 and/or the second gas supply line 432 through the circulation pump 434 provided to reuse the carbon dioxide.

Meanwhile, after a predetermined time has passed, the ballast water, for which the sterilization treatment is completed, is transferred to the outside of the tank 410 through the ballast water discharge line 402.

Figure 5:
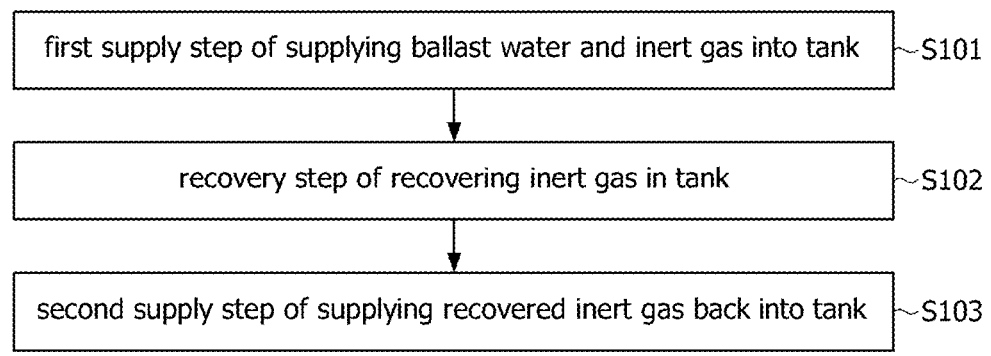
FIG. 5 is a flowchart illustrating a ballast water treatment method according to an exemplary embodiment of the present invention.

FIG. 5 is a flowchart illustrating a ballast water treatment method according to an exemplary embodiment of the present invention.

The treatment method includes a first supply step S101 of supplying the ballast water and the inert gas into the tank, a recovery step S102 of recovering the inert gas in the tank, and a second supply step S103 of supplying the recovered inert gas back into the tank.

As described above, in the first supply step, the ballast water and the inert gas may be sprayed together into the tank through the spray nozzle.

In addition, in the first supply step, the ballast water may be sprayed into the upper region in the tank through the spray nozzle, and the inert gas may be sprayed into the lower region in the tank through the bubble generator.

As described above, the inert gas in the upper region in the tank may be recovered through the gas discharge line and the circulation pump, and the recovered inert gas may be supplied back into the tank.

Figure 6:
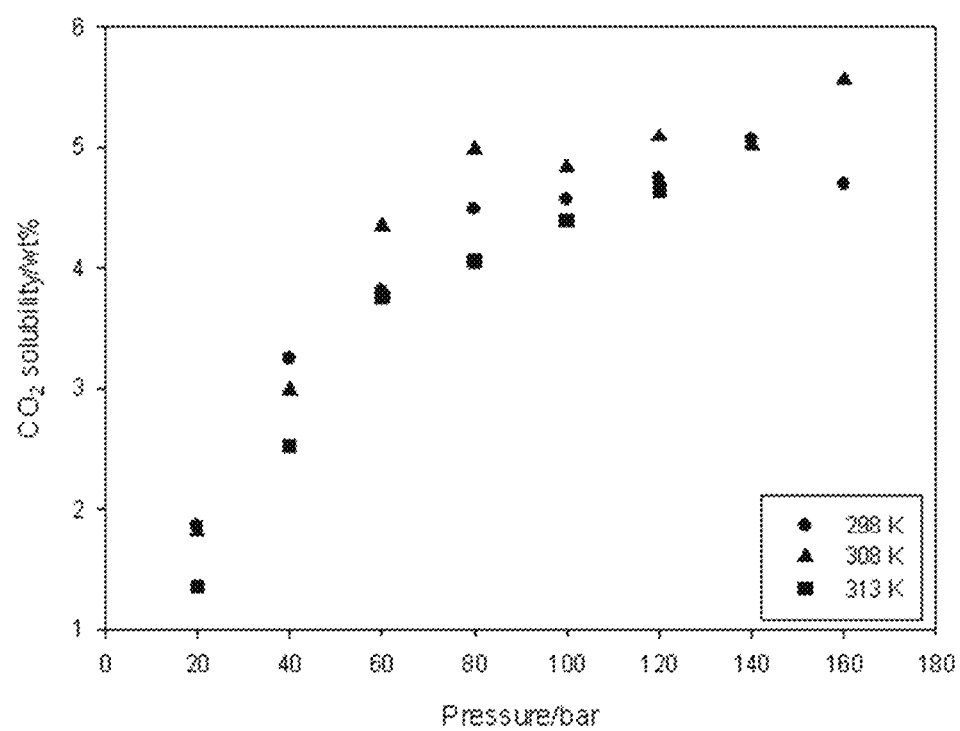
FIG. 6 is a graph illustrating a change of solubility of carbon dioxide in ballast water with respect to internal pressure of a tank of the ballast water treatment apparatus according to the exemplary embodiment of the present invention.

FIG. 6 is a graph illustrating a change of solubility of carbon dioxide in ballast water with respect to internal pressure of a tank of the ballast water treatment apparatus according to the exemplary embodiment of the present invention.

Referring to FIG. 6, artificial seawater is synthesized by using sea salt powder (Product No. S9883) that is a standard of seawater of Sigma Aldrich Inc., and salinity is 30 PSU. The produced artificial seawater was injected into the tank, and thereafter, a gaseous state in the sealed tank to which the artificial seawater is injected was purged by carbon dioxide under a normal pressure condition.

Internal pressure changed in the sealed tank was checked after 30 minutes after carbon dioxide at 10 bar was injected into the sealed tank, and the amount of carbon dioxide dissolved in the artificial seawater was calculated from the changed pressure by using a thermodynamic equation of state. The above process was checked up to 160 bar with pressure steps at 10 bar each, and the above process was repeated at temperatures of the artificial seawater of 298 K, 308 K, and 313 K.

In addition, referring to FIG. 6, it could be seen that carbon dioxide solubility is increased as internal pressure of the tank is increased, and carbon dioxide solubility is decreased under an equal pressure condition as a temperature of the artificial seawater is increased.

Figure 7:
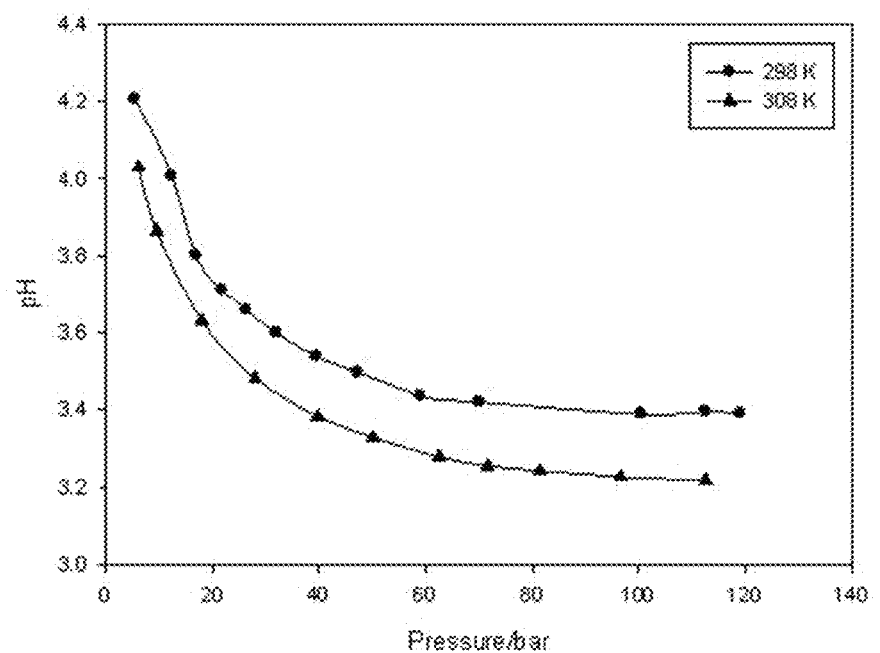
FIG. 7 is a graph illustrating a change of pH (hydrogen ion concentration exponent) of ballast water with respect to internal pressure of the tank of the ballast water treatment apparatus according to the exemplary embodiment.

FIG. 7 is a graph illustrating a change in the pH (hydrogen ion concentration exponent) of ballast water with respect to internal pressure of the tank of the ballast water treatment apparatus according to the exemplary embodiment.

The artificial seawater, which is produced to have salinity of 30 PSU, was injected into the tank, a pH meter (hydrogen ion concentration measuring device) was attached at a lower end of the tank, and thereafter, and the pH of the artificial seawater was measured in accordance with pressure of carbon dioxide in the tank.

Through the same process, carbon dioxide was injected into the tank, and after 30 minutes, the changed internal pressure of the tank and the pH of the artificial seawater measured by the pH meter were checked. The above process was checked up to 120 bar with pressure steps at 10 bar each, and the above process was repeated at temperatures of the artificial seawater of 298 K and 308 K.

Referring to FIG. 7, it could be seen that the pH of the artificial seawater is decreased as the internal pressure of the tank is increased, and the pH of the artificial seawater is decreased under an equal pressure condition as the temperature of the artificial seawater is increased.

Figure 8:
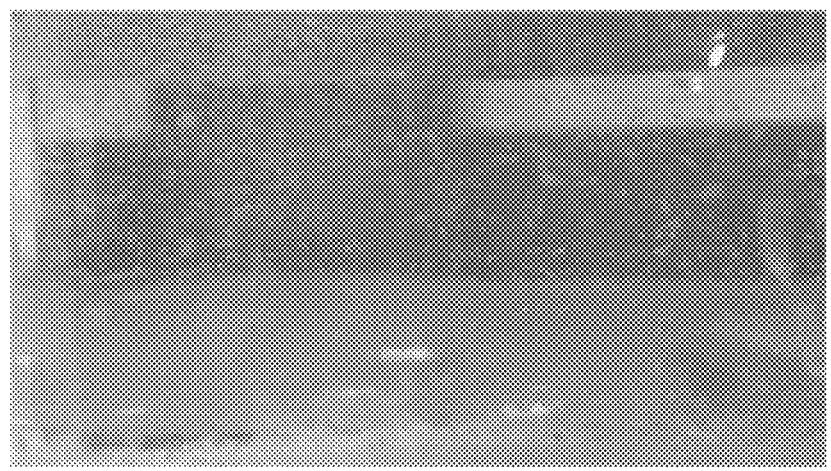
FIG. 8 is an image illustrating a state of marine microbes in ballast water before a sterilization treatment using carbon dioxide.
Figure 9:
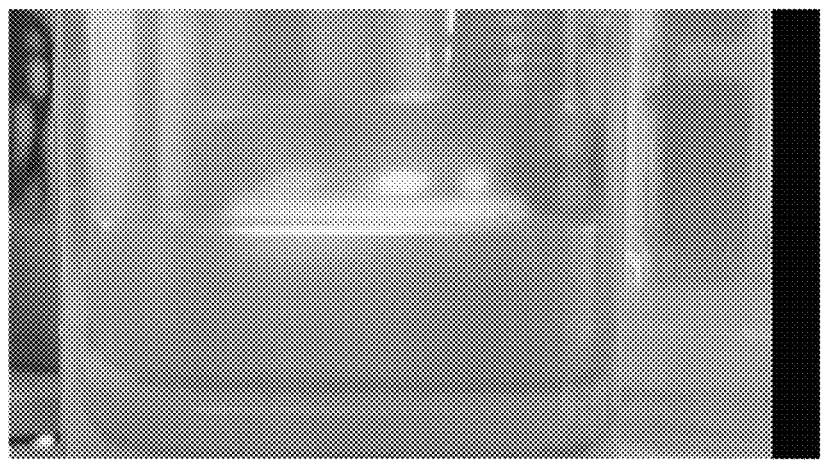
FIG. 9 is an image illustrating a change of marine microbes in ballast water after a sterilization treatment using carbon dioxide.

FIG. 8 is an image illustrating a state of marine microbes in ballast water before a sterilization treatment using carbon dioxide, and FIG. 9 is an image illustrating a change of marine microbes in ballast water after a sterilization treatment using carbon dioxide.

Figure 10:
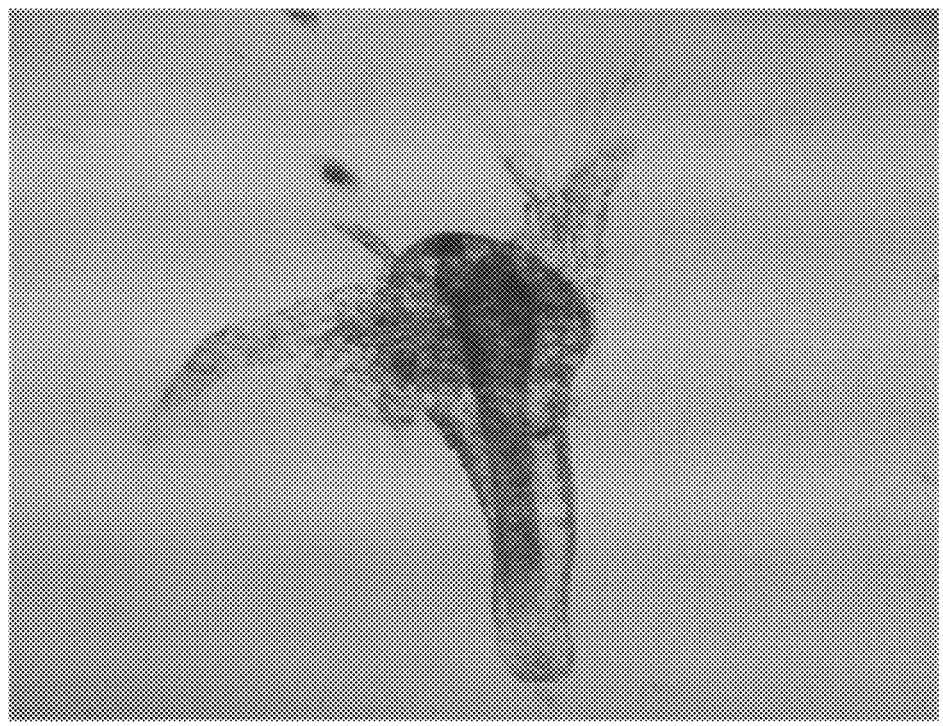
FIG. 10 is a microscope image at 400× magnification illustrating a state of marine microbes in ballast water before a sterilization treatment using carbon dioxide.
Figure 11:
FIG. 11 is a microscope image at 400× magnification illustrating a state in which marine microbes are dead in ballast water after a sterilization treatment using carbon dioxide.

In addition, FIG. 10 is a microscope image at 400× magnification illustrating a state of marine microbes in ballast water before a sterilization treatment using carbon dioxide, and FIG. 11 is a microscope image at 400× magnification illustrating a state in which marine microbes are dead in ballast water after a sterilization treatment using carbon dioxide.

Referring to FIG. 8, artemias, which are marine microbes, were incubated in the artificial seawater that was produced to have salinity of 30 PSU, and injected into the sealed tank, and thereafter, behavior of the artemias was observed while carbon dioxide is injected into the tank. It can be observed that the artificial seawater in which the artemias are incubated has high turbidity, and the artemias swim in the artificial seawater.

In addition, referring to FIG. 9, the artificial seawater in which the artemias were incubated was injected into the sealed tank, pressure in the sealed tank was maintained to 10 bar for 5 minutes by injecting carbon dioxide, and thereafter, the artificial seawater discharged through a ballast water discharge port was observed. It could be seen that a plurality of artemias in the artificial seawater did not swim, and sank to a lower end of the artificial seawater.

In addition, referring to FIG. 10, behavior of the artemias in the artificial seawater was intended to be checked by using an ocular lens with 10× magnification and an objective lens with 40× magnification of E600 of Nikon Corporation, and artemias, which have a size of about 300 μm and active motility, can be observed in the artificial seawater that is not treated by carbon dioxide.

In addition, referring to FIG. 11, artemias, which have a size of about 250 μm and do not move, can be observed in the artificial seawater that is treated by carbon dioxide.

It should be understood that the aforementioned exemplary embodiments of the present invention are described for illustration, and may be various modified, changed, and added by those skilled in the art without departing from the spirit and scope of the present invention, and the modification, change, and addition belong to the appended claims.

What is claimed is:

1. A ballast water treatment apparatus comprising:
   a tank;
   a spray nozzle which supplies ballast water in the form of droplets into said tank; and
   a gas circulation unit which includes a first gas supply line which supplies an inert gas to said spray nozzle so that inert gas, together with said ballast water, is supplied into said tank, a second gas supply line which supplies said inert gas in the form of bubbles into said tank, and a gas discharge line which sucks said inert gas in said tank
   wherein said gas circulation unit includes:
   a gas supply source which supplies inert gas;
   a circulation pump which circulates inert gas; and
   a bubble generator comprising a bubble outlet which is provided in the second gas supply line,
   said first and second gas supply lines are branched and each is in communication with the gas discharge line such that said inert gas which is sucked through said gas discharge line is supplied back to at least one line of said first gas supply line and said second gas supply line, and
   said bubble generator is provided to be positioned in the lower region in said tank.

2. The ballast water treatment apparatus of claim 1, wherein said spray nozzle includes:
   a ballast water supply line which is connected with said first gas supply line and supplied with said ballast water;
   a nozzle body into which said ballast water and said inert gas flow through said ballast water supply line and said first gas supply line; and
   a nozzle head which has one or more spray holes.

3. The ballast water treatment apparatus of claim 2, wherein said nozzle head is provided to spray said ballast water into an upper region in said tank, and said gas discharge line is provided to suck said inert gas in said upper region in said tank by an operation of said circulation pump, and
   said gas discharge line is provided to suck said inert gas into said gas supply line or to discharge said inert gas outside.

4. The ballast water treatment apparatus of claim 1, wherein said first gas supply line and said second gas supply line branch off between said circulation pump and said spray nozzle.

5. The ballast water treatment apparatus of claim 1, further comprising:
   an electrolysis unit which includes one or more electrode plates and is provided in said tank.

* * * * *